(12) United States Patent
Cort

(10) Patent No.: US 7,820,053 B2
(45) Date of Patent: Oct. 26, 2010

(54) MAGNETIC SEPARATION AND SEEDING TO IMPROVE BALLASTED CLARIFICATION OF WATER

(76) Inventor: Steven L. Cort, 411 Bathgate La., Cary, NC (US) 27513

( * ) Notice: Subject to any disclaimer, the term of this patent is extended or adjusted under 35 U.S.C. 154(b) by 0 days.

(21) Appl. No.: 11/862,528

(22) Filed: Sep. 27, 2007

(65) Prior Publication Data

US 2008/0073278 A1    Mar. 27, 2008

Related U.S. Application Data

(60) Provisional application No. 60/847,382, filed on Sep. 27, 2006.

(51) Int. Cl.
*C02F 1/48* (2006.01)
*C02F 1/52* (2006.01)

(52) U.S. Cl. ............... 210/695; 210/711; 210/713; 210/714; 210/738

(58) Field of Classification Search ................ 210/695
See application file for complete search history.

(56) References Cited

U.S. PATENT DOCUMENTS

| | | | | |
|---|---|---|---|---|
| 3,697,420 | A | * | 10/1972 | Blaisdell et al. ............ 210/695 |
| 4,039,447 | A | * | 8/1977 | Miura et al. ................ 210/425 |
| 6,010,631 | A | * | 1/2000 | Delsalle et al. ............ 210/713 |
| 6,099,738 | A | * | 8/2000 | Wechsler et al. ........... 210/695 |
| 6,210,587 | B1 | * | 4/2001 | Vion .......................... 210/711 |
| 6,896,815 | B2 | * | 5/2005 | Cort .......................... 210/695 |
| 6,919,031 | B2 | * | 7/2005 | Blumenschein et al. ..... 210/711 |
| 7,001,519 | B2 | | 2/2006 | Linden et al. |
| 7,001,525 | B2 | * | 2/2006 | Binot et al. ................ 210/709 |
| 7,255,793 | B2 | | 8/2007 | Cort |
| 7,311,841 | B2 | * | 12/2007 | Binot et al. ................ 210/666 |

* cited by examiner

*Primary Examiner*—Peter A Hruskoci
(74) *Attorney, Agent, or Firm*—Michael de Angeli

(57) ABSTRACT

A process for removing fine particles and particulates from water. The process includes mixing a magnetic ballast, flocculant and water to form magnetic floc, and agitating the magnetic floc in a flocculation zone. A portion of the magnetic floc is collected on a magnetic collector in the flocculation zone. Another portion of the magnetic floc is directed downstream to a setting zone where the magnetic floc is settled. The settled magnetic floc is returned upstream of the settling zone where the returned magnetic floc is recombined with other magnetic floc in the flocculation zone. Ultimately, all, or substantially all, of the magnetic floc is removed by one or more magnetic collectors disposed upstream of the settling zone.

13 Claims, 2 Drawing Sheets

MAGNETIC SEPARATION AND SEEDING TO IMPROVE BALLASTED CLARIFICATION OF WATER

CROSS-REFERENCE TO RELATED APPLICATION

This application claims priority under 35 U.S.C. § 119(e) from the following U.S. provisional application: Application Ser. No. 60/847,382 filed on Sep. 27, 2006. That application is incorporated in its entirety by reference herein.

FIELD OF THE INVENTION

The present invention relates to treating water, and more particularly to a ballasted flocculation process utilizing magnetic ballast.

BACKGROUND OF THE INVENTION

Water has been commercially cleaned by magnetic seeding and separation technologies for many years. Briefly, these technologies involve adding a magnetic seed material (preferably magnetite) to water that contains fine pollutant particles. Agitating the magnetic seed material and fine pollutant particles in the presence of an organic flocculating agent produces a composite particle that is magnetic and easily removed from the water with either permanent magnets or electromagnets.

A known commercial application of magnetic seeding is the "Sirofloc" technology used in Australia to clean drinking water. This process uses the absorption capacity of magnetite to remove color and other pollutants from water. The spent magnetic seed material (magnetite) settles out by gravity in a clarifier and is then pumped to a magnetite regeneration step that cleans the magnetite so it can be reused.

Another known commercial application of magnetic seeding is the "Comag" process described in Wechsler U.S. Pat. No. 6,099,738. This process employs a high gradient field magnetic collector that uses powerful electromagnets. Once the collector becomes loaded with solids, it is backwashed with air and water to flush the magnetic seed material to a cleaning process. The cleaned magnetic seed material is then reused in the treatment process. The electromagnets in the Comag system have to be de-energized for cleaning. The cleaning process interrupts the flow of water for treatment and high solids loading limits the ability to backwash the system.

There are also various patents covering the use of ballast materials to enhance the clarification of water. These patents disclose the use of micro-sand, garnet, magnetite, and other granular materials with a density greater than water as suitable ballast material used to clarify water. In the ballast clarification process, polymers are used to attach fine pollutant particles to high density ballast materials to increase the settling rate of the pollutant particles. In the "Actiflo" process offered by Kruger Inc. of Cary, N.C., and exemplified by FIG. 1 hereof, the settled particles are pumped to a hydrocyclone for cleaning. The pumping action is intended to break the bond between the ballast and the pollutant particles; then the hydrocyclone centrifugally separates the ballast so it can be returned to the process for reuse. The pollutant particles are then sent to a dewatering system to further reduce their volume.

SUMMARY OF THE INVENTION

A ballasted flocculation process for treating water is disclosed where the ballast comprises a magnetic ballast or seed such as magnetite. Magnetic floc is formed in a flocculation zone or tank by mixing the magnetic seed and a flocculant in the water to be treated. A magnetic collector collects at least some of the magnetic floc from the flocculation zone thereby performing a clarification function in the flocculation zone. Water and other magnetic floc moves downstream to a settling tank or zone where at least some of the remaining magnetic floc settles. The settled magnetic floc is transferred or moved from the settling zone or tank back upstream to a point ahead of the settling tank where the magnetic floc is collected.

In one embodiment, the magnetic collector is disposed in the flocculation zone or tank, and the settled magnetic floc is directed back to the flocculation zone or tank where the magnetic floc is collected by the magnetic collector disposed in the flocculation zone.

In one particular embodiment, the magnetic collector disposed in the flocculation tank is a rotary magnetic collector. The rotary magnetic collector is rotated in the water in the flocculation zone, and in the process magnetic floc in the water is collected on the rotary magnetic collector. The collected magnetic floc is removed from the magnetic collector and directed to a shear chamber that shears the magnetic floc producing magnetic seed or ballast and sludge. This sludge is directed from the process while the magnetic ballast or seed is recycled.

Other objects and advantages of the present invention will become apparent and obvious from a study of the following description and the accompanying drawings which are merely illustrative of such invention.

DETAILED DESCRIPTION OF THE INVENTION

The present invention relates to a process for removing fine particles and particulate from water. The fine particles may include metal precipitants, organic solids, inorganic solids, clays, silts, oil and grease, and any other hard to remove fine solids. As used herein, the term "water" includes wastewater such as industrial wastewater, municipal wastewater, combined sewer overflow, storm water, processed water, cooling water, potable water, and any other waters that require clarification to remove fine particles. As discussed herein, the process uses magnetic separation technology where a fine magnetic seed material, such as magnetite, is added to the water along with an organic flocculating polymer. The organic flocculating polymer binds the non-magnetic pollutant particles to the magnetic seed material, and then the composite particles are removed magnetically from the water with either permanent magnets or electromagnets. The magnetic seed material is then cleaned and reused. Specifically, this invention describes a method or process where magnetic ballast or seed is utilized to clarify water being treated.

A ballasted clarification system uses a seed material that is heavier than water to weigh down less dense pollutant particles, so that they settle out of the water stream to be treated. A flocculant such as an organic flocculating polymer is used to attach the pollutant particles to the ballast material.

Figure 1:
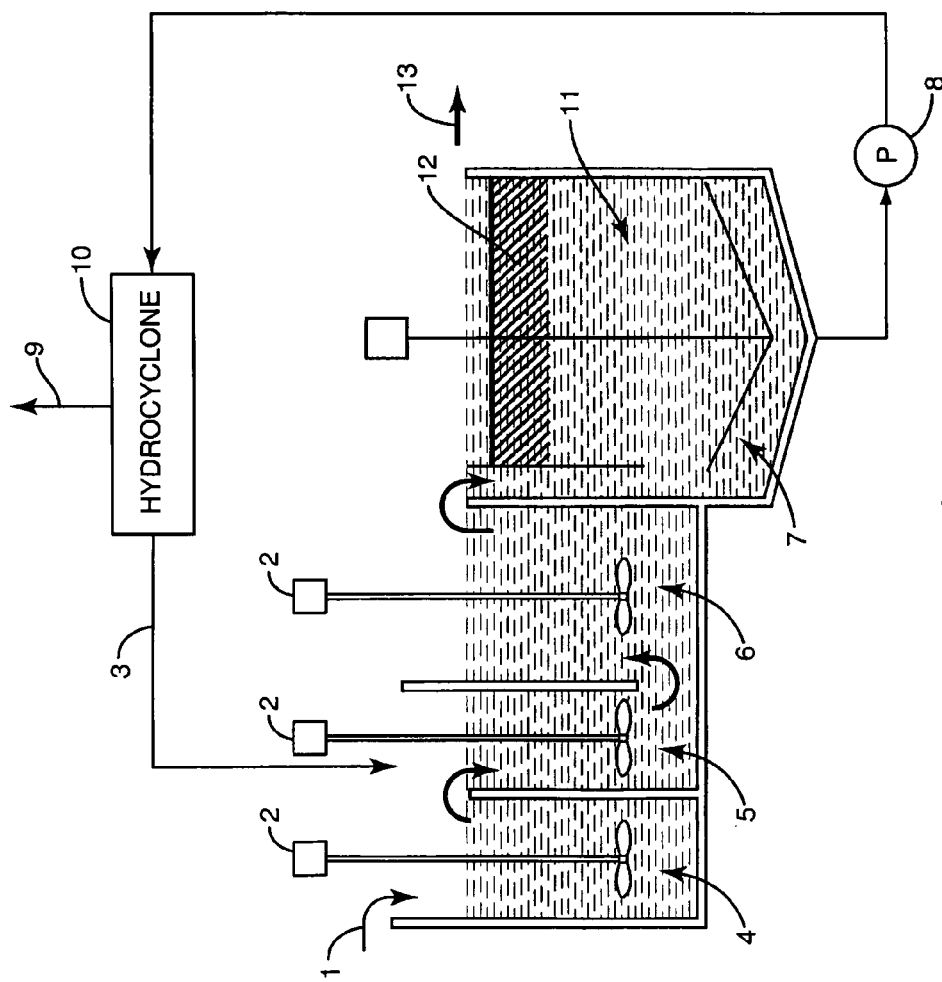
FIG. 1 is a schematic illustration of a ballasted flocculation process as practiced in the prior art.

FIG. 1 illustrates a prior art ballasted flocculation process for clarifying water. Water 1 enters into a series of flocculation chambers 4, 5, and 6 the contents of which are agitated by mixers 2 to bring pollutants into contact with ballast material (non-magnetic) in the presence of a flocculating polymer. The combined particles flow into a settling chamber 11 where the particles settle by gravity and the clarified water exits through separator plates or lamella 12 and out an outlet 13. In a typical ballast system, the settled particles are moved to a pump inlet with a scraper 7 and then pumped with a high shear pump 8 to a hydrocyclone 10 that centrifugally separates the pollutants from the ballast material. Pollutants are discharged 9 from the system and the ballast material 3 is returned to the flocculation chamber 5. The pump applies enough shearing action to break the floc, detaching the ballast from the pollutant particles, so they can be effectively separated in the hydrocyclone.

Figure 2:
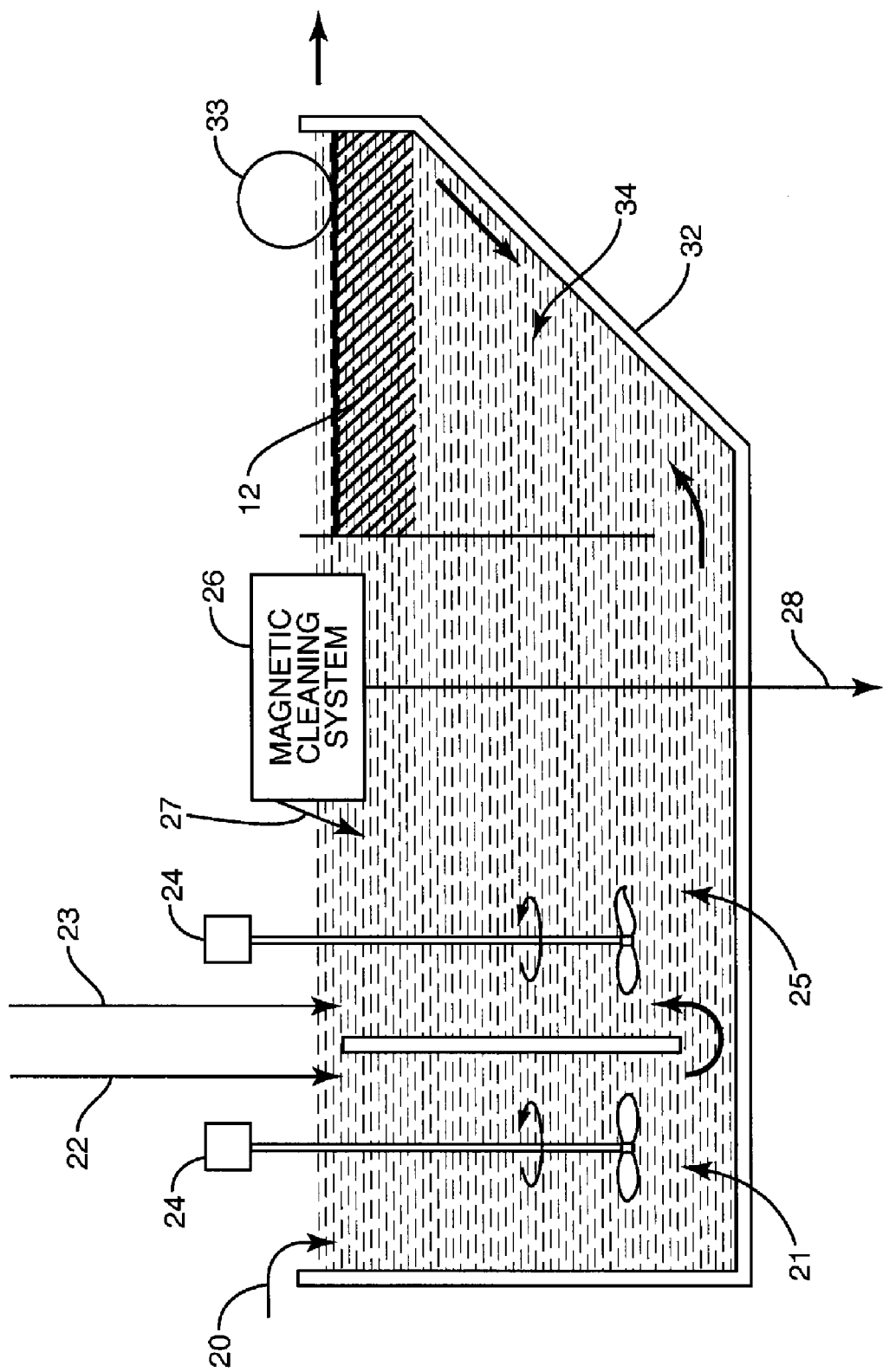
FIG. 2 is a schematic illustration of a ballasted flocculation process where the ballast comprises magnetic seed that are utilized to form magnetic floc.

FIG. 2 illustrates a ballasted flocculation system and process according to the present invention where the ballast or seed comprises magnetic material such as magnetite. In this process, water flows via an inlet 20 into a mixing zone or chamber 21 where treatment chemicals, specifically coagulants, flocculants, and/or phosphate removing chemicals are added through injection lines 22, 23. Effective mixing is provided by a stirring device 24 in zone 21. The water being treated then flows into another mixing or flocculation zone or chamber 25 where the fine particles and particulate matter attach to magnetic seed, such as magnetite, which is a form of iron oxide. Chamber 25 can be referred to as a flocculation chamber or zone because in this zone the magnetic seed attaches to particulate matter and the particulate matter agglomerates around the magnetic seed to form magnetic floc. In the flocculation zone 25 is located a magnetic seed cleaning system 26 (sometimes referred to as a magnetic cleaning system) which collects a fraction or a portion of the "dirty" magnetite particles or magnetic floc which, in one example, are composed of particles made up of magnetite bound by the flocculant to the particulate matter to be removed from the water. In one embodiment, the magnetic seed cleaning system 26 includes a rotating magnetic drum that is at least slightly submerged in the water in the flocculation zone. The drum is scraped to remove the collected magnetic floc, and the magnetic floc is directed to a shear tank that forms a part of the magnetic seed cleaning system 26. The shear tank includes a shear mixer that produces a sheared slurry comprised of the magnetic seed, which in the case of one embodiment is magnetite, and sludge. The cleaned magnetic seed or magnetite is then returned at 27 to the flocculation zone 25 while the sludge is discharged from the system through line 28.

The magnetic floc from chamber 25 then flows into a downstream settling chamber or zone 34 that is located beneath a gravity separation device 12 such as lamella or separator plates. Also disposed in the settling tank adjacent the outlet thereof is a magnetic separator 33. Large magnetic floc, which are separated by the gravity separation device 12, settle downwardly on an inclined bottom 32 of the settling chamber or zone 34. The slope of bottom 32 is steep enough to allow the magnetic floc to slide down the incline and back into the flocculation zone 25. Clarified water flows out of the settling tank 34 and if necessary can flow past the magnetic separator 33 to remove any remaining magnetic floc. The clean or clarified effluent is then discharged from the settling tank 34.

Magnetic separator 33 is preferably composed of permanent magnets that are continuously cleaned. For example, magnets may be disposed in one or more disks rotated about a horizontal axis, with scrapers in contact with the disk surfaces to remove the collected magnetic particles or magnetic floc. The magnetic floc are scraped off the magnetic separator 33 and flow or fall into the settling zone 34 and then back down the inclined bottom 32 and then into the flocculation zone 25 where the magnetic floc can recombine with other magnetic floc and eventually removed by the magnetic cleaning system 26. That is, eventually all of the magnetic floc comes into contact with the magnetic separator associated with the magnetic cleaning system 26, where the magnetic ballast or seed, such as magnetite, is removed from the magnetic floc and recycled while the sludge is directed from the system via line 28.

As noted above, the settled magnetic floc that slides down inclined bottom 32 enters the flocculation zone 25. Because of the mixing or agitating action of the mixer 24 in zone 25, the previously settled magnetic floc is generally mixed in flocculation zone 25, and because of the mixing action remains in a generally homogeneous suspension in the vicinity of the magnetic cleaning system 26. Thus, even the previously settled magnetic floc will eventually move into contact with the magnetic collector associated with the magnetic cleaning system 26.

In some cases it may be desirable to collect settled magnetic floc in the settling zone or tank 34 itself. Therefore, it is contemplated that a magnetic collector may be designed to extend adjacent the inclined bottom 32 of the settling tank 34. This will permit the settled magnetic floc to actually be collected while in the settling tank 34. By utilizing a magnetic collector in the settling tank, this eliminates the cost of a pump and will result in less shearing of the floc. Another alternative design includes the possibility of providing a low shear pump, such as a diaphragm pump or a progressive cavity pump that removes the settled magnetic floc from the settling zone or tank 34 and directs the magnetic floc to a shearing device that will separate the magnetic ballast from the sludge and permit the magnetic ballast to be recycled.

In FIG. 2, the mixer 24 in flocculation zone 25 is schematically illustrated as being offset in the flocculation zone. It is appreciated that more than one mixer 24 can be provided in the flocculation zone 25 or that the mixer shown therein can be generally centrally located so as to maintain magnetic floc in suspension generally uniformly throughout the flocculation zone in order that the magnetic floc can come into contact with the magnetic separation system 26.

In disclosing and describing the methods and systems for treating water, magnetic seeding and magnetic separation have been disclosed as a part of the magnetic cleaning system 26 and as a means of clarifying and removing solids from the water. Generally, magnetic seeding and separation entails mixing magnetic seed, such as magnetite, with the water being treated. Through flocculation, adsorption, absorption and other physical or chemical means, contaminants such as suspended solids, scalants, heavy metals, etc. attach to the magnetic seed to form magnetic particles or magnetic floc. In the case of flocculation, a coagulant and a flocculant may be mixed with the water. Typically, the process of magnetic separation entails utilizing a magnetic collector such as a rotary magnetic drum or a series of rotary magnetic disks. Such collectors are at least partially submerged in the water being treated and are driven. In the process, magnetic particles or magnetic floc are collected by the magnetic collector. These magnetic particles or magnetic floc are removed from the magnetic collector and directed to a shear chamber. In the shear chamber, the magnetic particles or magnetic floc are sheared, separating the magnetic seed and effectively producing magnetic seed and sludge. The same magnetic collector, or a second magnetic collector, can be utilized to collect the separated magnetic seed. After the magnetic seed has been collected by the magnetic collector, the seed is removed from the magnetic collector and returned to the same treatment tank or chamber, or otherwise recycled. The separated sludge is collected and directed from the system or process.

Reference is made to the magnetic seeding and subsequent separation techniques disclosed in application Ser. No.

11/503,951 (the '951 application) and U.S. Pat. No. 7,255,793. The disclosures of the '951 application and U.S. Pat. No. 7,255,793 are expressly incorporated herein by reference.

As used herein the term "water" includes water and all forms of wastewater. "High rate clarifiers" are defined as clarifiers that have a surface overflow rate greater than five gallons per minute per square foot of surface area.

Thus, according to the invention, magnetite is used both as a conventional ballast, that is, separation is accomplished by gravity acting on the massive composite particles to settle them out of the water stream, and as a magnetic component of the composite particles, so that magnetic separation can additionally be performed.

There are three major advantages of this approach over traditional ballast clarification. The first advantage is that the waste discharged from the system is more concentrated because the magnetic seed is removed magnetically by a magnetic collector as a wet solid. This greatly reduces the amount of water in the waste. The second advantage is that magnetic seed or ballast from the final separation chamber flows back into the flocculation chamber by gravity without the use of a pump or scraper device. The third advantage is the SOR (surface overflow rate) in the final collector can be higher because of the final magnetic collector 33. That is, because magnetic collection is more effective than gravity collection, the throughput of the system can be increased.

The present invention may, of course, be carried out in other specific ways than those herein set forth without departing from the scope and the characteristics of the invention. The present embodiments are therefore to be construed in all aspects as illustrative and not restrictive and all changes coming within the meaning and equivalency range of the appended claims are intended to be embraced therein.

The invention claimed is:

1. A ballasted flocculation process for treating water having pollutant particles, comprising:
   a. mixing a magnetic ballast, flocculant and the water to form magnetic floc;
   b. agitating the magnetic floc in a flocculation zone;
   c. collecting some of the magnetic floc on a first magnetic collector positioned in the flocculation zone;
   d. shearing the collected magnetic floc to produce a sheared slurry including magnetic ballast and sludge;
   e. recycling the magnetic ballast to the flocculation zone;
   f. directing the water and some of the magnetic floc to a settling zone located downstream from the flocculation zone;
   g. settling by gravity some of the magnetic floc in the settling zone;
   h. returning at least a portion of the settled magnetic floc to the flocculation zone upstream from the settling zone; and
   i. magnetically collecting the returned magnetic floc at a point upstream from the settling zone.

2. The process of claim 1 including collecting the returned magnetic floc on the first magnetic collector.

3. The process of claim 1 wherein the settling zone and flocculation zone are disposed in a single tank, and wherein the settling zone is disposed in a portion of the tank having a bottom having an inclined surface, and the method includes utilizing the inclined surface of the bottom to move the settled magnetic floc towards the flocculation zone.

4. The method of claim 1 including collecting magnetic floc in the settling zone with a second magnetic collector.

5. The method of claim 1 wherein the first magnetic collector comprises a rotary magnetic collector disposed in the flocculation zone, and the method further including:
   a. rotating the rotary magnetic collector in the flocculation zone;
   b. collecting magnetic floc from the water in the flocculation zone on the rotary magnetic collector;
   c. removing the collected magnetic floc from the rotary magnetic collector;
   d. transferring the magnetic floc to a shearing device;
   e. shearing the magnetic floc to produce a sheared slurry including magnetic ballast and sludge; and
   f. recycling the magnetic ballast to the flocculation zone.

6. The process of claim 1 wherein the first magnetic collector is a rotary magnetic collector and the method includes at least partially submerging the rotary magnetic collector in the flocculation zone and rotatively moving the magnetic collector through the water in the flocculation zone and collecting magnetic floc in the process.

7. The process of claim 6 including providing a second rotary magnetic collector in the settling zone and collecting magnetic floc from the water in the settling zone in the second magnetic collector.

8. The process of claim 7 including concentrating the magnetic floc in the settling zone by collecting magnetic floc from the water in the settling zone with the second rotary magnetic collector and removing the magnetic floc collected on the second rotary magnetic collector and allowing the removed magnetic floc to fall into the settling zone.

9. The method of claim 1 wherein the magnetic ballast is magnetite or other ferromagnetic material.

10. The method of claim 1 wherein the water being treated is taken from the group consisting of municipal wastewater, industrial wastewater, and mining wastewater.

11. A process that combines ballasted flocculation and magnetic seeding and separation to clarify water, comprising:
   a. mixing a flocculant and a magnetic seed with a water to be treated to form magnetic floc;
   b. flocculating the magnetic floc in a flocculation zone and maintaining the magnetic floc in suspension in the flocculation zone;
   c. disposing a movable magnetic collector in the flocculation zone and moving the magnetic collector through the water in the flocculation zone and collecting a portion of the magnetic floc that is in suspension in the water in the flocculation zone;
   d. removing the collected magnetic floc from the magnetic collector;
   e. directing the water and some of the magnetic floc to a downstream settling tank having an inclined bottom;
   f. settling by gravity the magnetic floc in the settling tank such that the magnetic floc settles and engages the inclined bottom of the settling tank; and
   g. utilizing the inclined bottom of the settling tank to direct the settled magnetic floc to direct the settled magnetic floc towards the flocculation zone; and
   h. returning the settled magnetic floc to the flocculation zone and maintaining the settled magnetic floc in suspension in the flocculation zone such that settled magnetic if floc can be collected by the moving magnetic collector.

12. The method of claim 11 including disposing a magnetic collector in the settling tank and collecting magnetic floc on the magnetic collector in the settling tank.

13. The method of claim 12 including concentrating the magnetic floc in the settling tank by collecting magnetic floe on the magnetic collector in the settling tank and removing the collected magnetic floc from the magnetic collector in the settling tank and allowing the removed magnetic floc to return to the settling tank.

* * * * *